United States Patent [19]

Taylor

[11] 4,115,777
[45] Sep. 19, 1978

[54] AIRCRAFT LANDING SYSTEMS
[75] Inventor: Frank Howard Taylor, London, England
[73] Assignee: Plessey Handel und Investments AG, Zug, Switzerland
[21] Appl. No.: 736,355
[22] Filed: Oct. 27, 1976
[30] Foreign Application Priority Data
Oct. 28, 1975 [GB] United Kingdom ............... 44398/75
[51] Int. Cl.² .......................... G01S 1/18; G01S 1/10
[52] U.S. Cl. ................................ 343/108 R; 343/109
[58] Field of Search ............................ 343/108 R, 109
[56] References Cited
PUBLICATIONS
Avionics Navigation Systems, M. Kayton & W. Fried, John Wiley & Sons, New York, N.Y. 1969. pp. 528-535, 539.

Primary Examiner—Maynard R. Wilbur
Assistant Examiner—Richard E. Berger
Attorney, Agent, or Firm—Fleit & Jacobson

[57] ABSTRACT

A dual I.L.S. glide slope system for allowing a normal 3° descent path plus an additional 6° descent path which can be used for noise abatement procedures etc. In accordance with the present invention these glide slopes are provided on a single assigned R.F. channel with no inverted courses interposed. The first signal null will occur at 9° elevation when all signals will be zero, producing a "flag" alarm.

6 Claims, 8 Drawing Figures

AIRCRAFT LANDING SYSTEMS

This invention relates to aircraft landing systems and relates more specifically to instrument landing systems including ground-based localiser equipment which may provide azimuth guidance of an aircraft along the centre-line of a runway and ground-based glide path equipment which provides elevational guidance or glide path control of an aircraft, the glide path equipment affording a straight line descent path in the vertical plane (elevation) which usually contains the aforesaid runway centre-line. For conventional winged aircraft the localiser antenna for transmission of the localising radiation pattern is usually located centrally at the far end of the runway whilst the glide path equipment is offset to one side of the runway centre-line towards the approach end of the runway.

In instrument landing systems of the kind just above described the localiser antenna system may be arranged to produce a radiation pattern with two lobes having a null or equi-signal position between them defining an azimuth approach to the centre-line of the runway. It is well-known to use glide path antenna systems, such as the so-called "null reference" system or "equi-signal" system, in which the glide path antenna system produces in co-operation with the ground acting as a radio mirror a multi-lobe radiation pattern affording a plurality of possible glide paths. Hitherto, the heights and ratio of heights above ground of antennae elements mounted on an aerial mast (two vertically spaced antennae in the case of the "null reference" system) are preselected to provide a radiation pattern giving a glide slope angle of substantially 3° in accordance with I.C.A.O. and C.A.A. requirements for conventional aircraft. The multi-lobe radiation pattern of this known glide path antenna system provides for a further glide slope angle of substantially 15° which is too steep for conventional aircraft landing approach to a runway. In this connection C.A.A. document entitled "Non Visual Precision Approach and Landing System for International Civil Aviation" dated July, 1972, recommends that a 6° glide slope angle would be an acceptable addition to the I.C.A.O. recommended 3° glide slope angle and suggests that the 3° glide slope could be used for conventional (C.T.O.L.)aircraft and the 6° glide slope for conventional (C.T.O.L.)and short take-off and landing (S.T.O.L.) aircraft. Light aircraft could use either glide slope as convenient.

The provision of a second, higher, glide slope angle of 6° in instrument landing systems for aircraft affords a number of advantages including the implementation of noise-abatement procedures by air traffic control by locating noisier aircraft on the higher glide slope approach path and the selective location of different aircraft (including helicopters) in the most appropriate glide path according to aircraft performance characteristics. For example, in the case of high landing speed aircraft or aircraft subjected to high tail winds the lower glide slope of 3° may be used to advantage whereas in the case of low landing speed aircraft or aircraft experiencing high head winds the higher glide slope at 6° may be utilised. Although in some instances it may be necessary to reverse what might otherwise be the ideal arrangement for selection of glide slope, such as for instance in the case of a large jet aircraft which might advantageously be positioned on the 6° glide slope for noise-abatement purposes but which due to the possible danger of jet turbulence falling into the lower 3° glide slope path which might be used simultaneously by a lighter aircraft the large jet will be located on the 3 glide slope, the availability of an alternative glide slope angle does afford very significant advantages by adding greater flexibility to aircraft landing procedures.

According to the present invention there is provided an aircraft landing system including ground-based glide path equipment comprising an antenna system consisting of two antennae mounted one above the other on a support structure at respective heights above ground in the ratio of 3 : 2 or thereabouts and signal generating and distribution means for generating and feeding respective signals to said antennae so that the antennae provide in combination a multi-lobe radiation pattern which produces resultant signals just below and just above slope paths at or about 3° and 6° angles to the ground for generating in an approaching aircraft "fly up" and "fly-down" signals, respectively, thereby providing for glide slope approaches by aircraft at said angles.

In carrying out the invention it is preferred to use the so-called "null reference" system but other systems such as the so-called equi-signal could possibly be used The "null reference" system will be used in cases where the landing area is free from obstruction or changes in terrain whereas other systems may be used when the terrain is of a more variable nature.

When the "null reference" system is used the lower antenna on the support structure may be energised to radiate a course radio frequency carrier with double sideband signals (hereinafter referred to as C.S.B.) in a multi-lobe elevation pattern. The upper antenna may be energised to radiate a course double sideband signal (hereinafter referred to as S.B.O.) to produce a multi lobe radiation pattern at 3/2 times the rate of the course carrier plus double sideband signal pattern and overlapping therewith. The combined radiation pattern of the two antennae provides zero difference in depth of modulation (D.D.M.) at glide path angles of 3° and 6°. The D.D.M. rises each side of each glide path angle, one sideband frequency (e.g. 150 Hz) being predominant just below each glide slope angle and the other sideband frequency (e.g. 90 Hz) being predominant just above the glide slope angle. Thus an approaching aircraft will receive "fly-up" (150 Hz) or "fly-down" (90 Hz) signal from the combined radiation pattern of the glide path antennae when it is located below or above a glide slope (3° or 6°) assigned to it by air traffic control (A.T.C.)

The glide path antenna system according to the invention positively avoids the occurrence of so-called "inverted courses" between possible glide slope angle of the radiation pattern.

Since both of the glide slope paths of 3° and 6° or thereabouts are independent of one another the air traffic control can use these simultaneously with suitable distance spacing between aircraft. These glide slope can be recognised in the aircraft by the rate of descent meter since there will be a difference of 2 : 1 in the aircraft descent rate indication. Thus when a particular glide slope path is assigned to an approaching aircraft the aircraft can be brought into the approximate correct attitude in elevation where it will be receiving "fly-up or "fly-down" signals appertaining to the assigned glid slope (i.e. 3° or 6°).

There will be no discontinuity on either of the glid slopes and it may be arranged for example that an air craft enters the glide slope path at about 10 nautica miles from the runway threshold. In this instance the aircraft would enter the 3° glide slope beam at 3150 ft. whereas it would enter the 6° glide slope beam at 6300 ft. It can be arranged that both of the glide slopes are hyperbolae with vertices 20 ft. above the runway touchdown point so that aircraft as they come in to land are positioned parallel to the runway.

By way of example the present invention will now be described with reference to the accompanying drawings in which.

Figure 1:
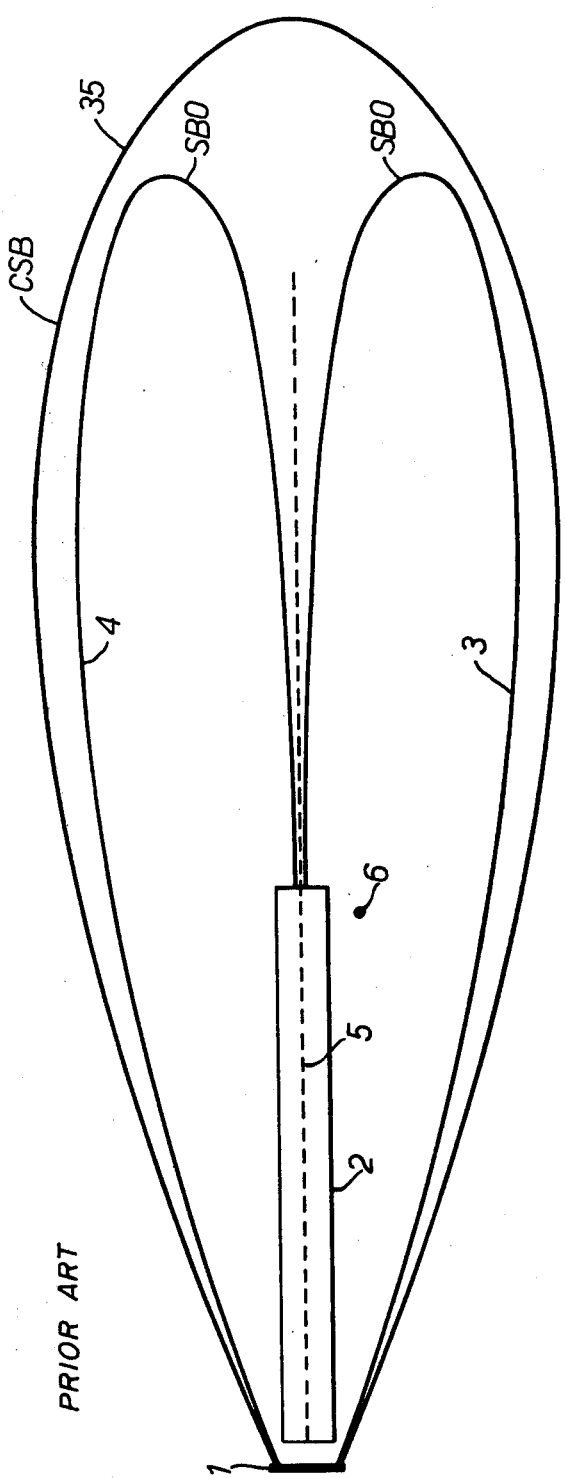
FIG. 1 shows an azimuth radiation pattern of a conventional localiser antenna for an I.L.S. system.

Referring to FIG. 1 of the drawings this shows the localiser antenna structure 1 located at the far end of an aircraft runway 2. As is well known practice, the localiser antenna structure may be energised to produce a radiation azimuth pattern having S.B.O. lobes 3 and 4 and C.S.B. lobe 35 as indicated, with the line between the lobes 3 and 4 being coincident with the centre line 5 of the runway 2. This radiation pattern enables approaching aircraft fitted with I.L.S. equipment to take up azimuth course along the centre line 5 of the runway. However, to enable the aircraft to approach the runway at the I.C.A.O. and C.A.A. recommended glide slope angle of 3° for conventional aircraft a glide path antenna system 6 is provided near the approach or threshold end of the runway 2, this antenna system being offset to one side of the runway centre line 5.

Figure 2:
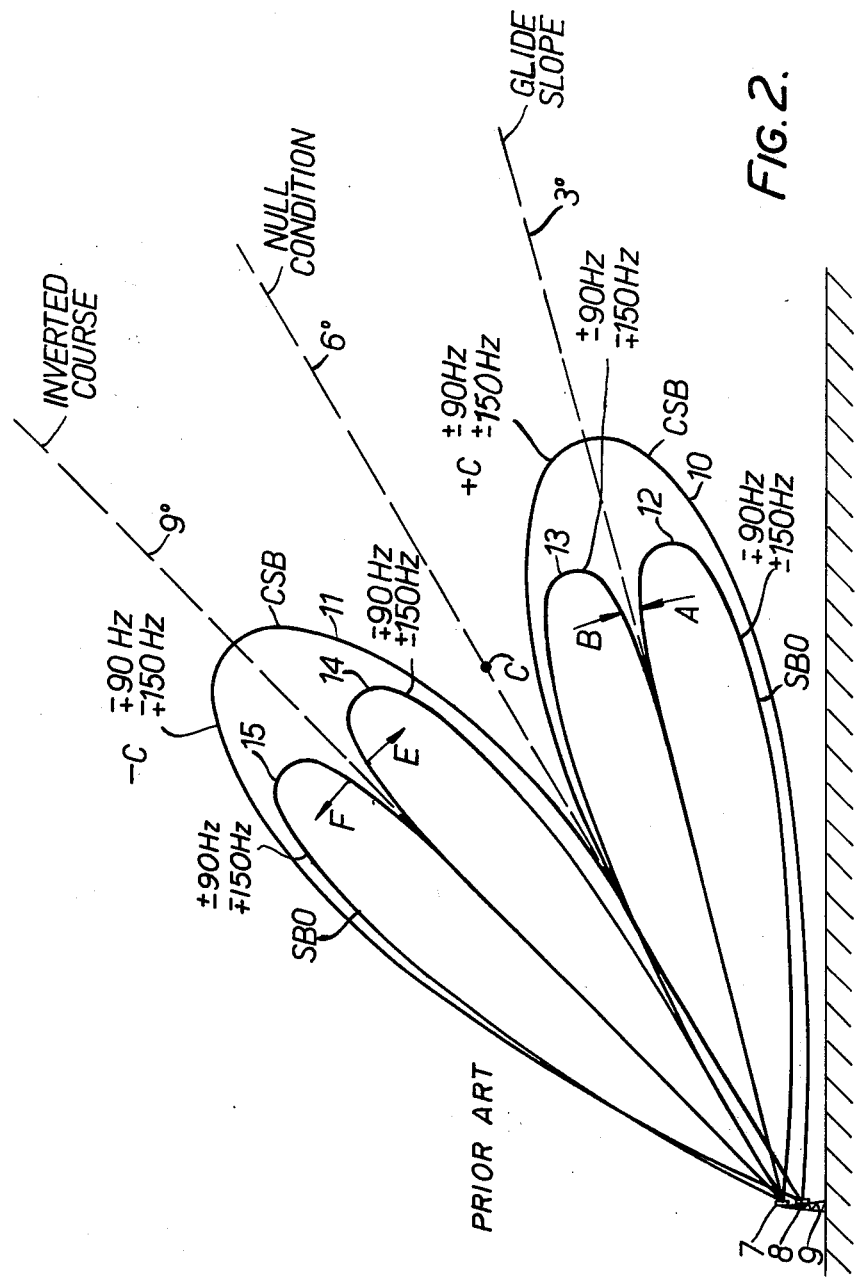
FIGS. 2 and 3 show the elevation radiation pattern and characteristic curve (linear amplitude against elevation) diagram, respectively, of a well-known form of glide path antenna system.

In FIG. 2 is shown a known form of glide path antenna system and its radiation pattern. The antenna system comprises two antennae 7 and 8 mounted on an antenna mast structure 9. The upper antenna 7 is at twice the height above ground of the lower antenna 8. Typical heights of the antennae 7 and 8 are 28 ft. and 14 ft. respectively. The lower antenna 8 will be energised with a double sideband plus carrier signal (i.e. C.S.B. signal) the sidebands of which are separated from the carrier frequency by 90 Hz and 150 Hz and the mean frequency components of which are in phase with the radio frequency carrier. The carrier frequency is within the band 328-336 MHz. Such energisation of the lower antenna 8 produces the C.S.B. radiation lobes 10 and 11 in FIG. 2. The upper antenna 7 is energised with a course double sideband signal S.B.O. the sidebands being separated from the absent carrier by 90 Hz and 150 Hz. The mean frequency components of the 150 Hz sidebands are 180° out of phase with the mean frequency components of the 90 Hz sidebands and the 150 Hz sidebands are in phase with the radio frequency carrier of the course C.S.B. signal. The upper antenna 7 accordingly produces a multi-lobe radiation pattern comprising the S.B.O. lobes 12 and 13 without C.S.B. lobe 10 and S.B.O. lobes 14 and 15 within the C.S.B. lobe 11. To assist in the understanding of the system illustrated the frequencies of the lobe signals have been indicated. As will readily be appreciated from the radiation pattern diagram, approaching aircraft located at A will receive a signal whose frequency is the combination of frequency of lobe 12 with that of lobe 10, resulting in a signal in which the 150 Hz tone predominates. The predominance of the 150 Hz tone produces a "fly-up" signal so that the aircraft can climb towards the glide slope path at 3°. If the aircraft is located at position B the frequency of signal received from the radiation pattern will have a predominance of the 90 Hz tone which will generate a "fly-down" signal. In this case the aircraft will need to descend in order to take up an attitude between A and B corresponding to the glide slope path at 3°. The aircraft rate of descent meter will indicate whether the aircraft is near to the glide slope angle.

Figure 3:
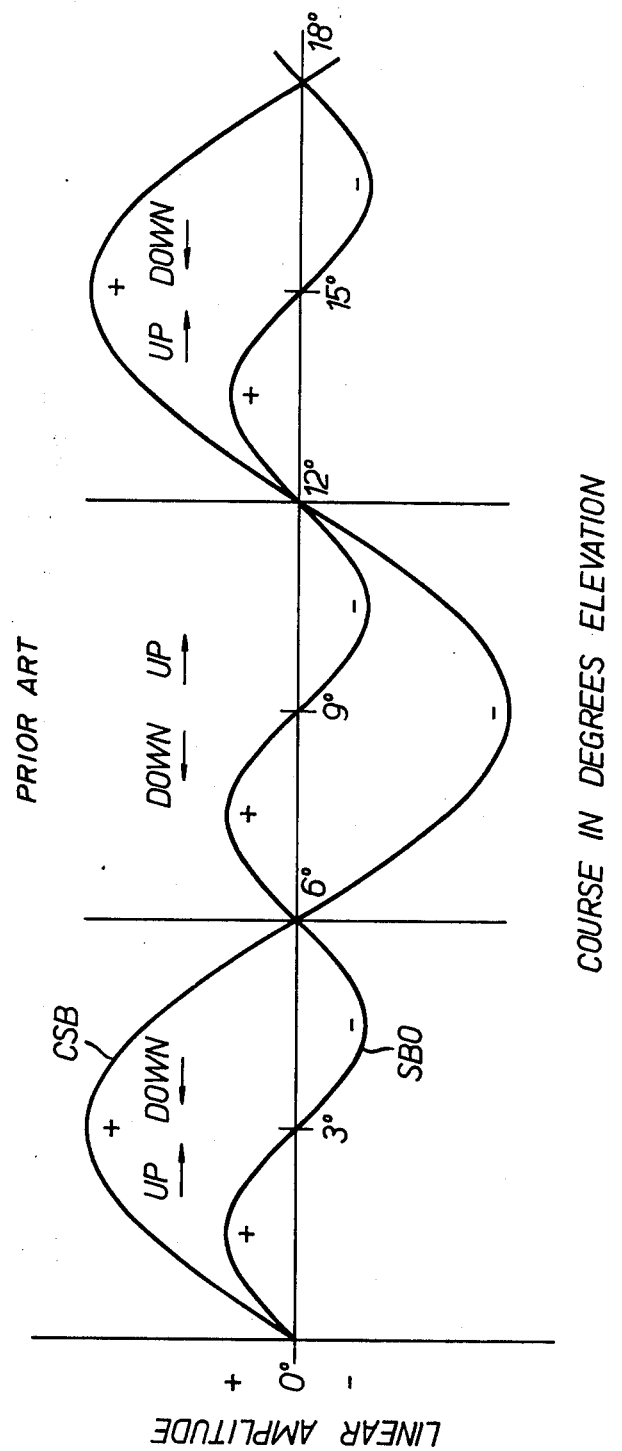

It will be seen that if the aircraft were located at position E or position F the predominance of the 90 Hz signal or the 150 Hz signal would produce "fly-down" or "fly-up" signals to position the aircraft on a 9° inverted glide slope. This glide slope of 9° is therefore not acceptable for aircraft and is too steep anyway. A glide slope of 6° however, would be acceptable as an additional glide slope to the 3° glide slope, as recommended in the previously referred to C.A.A. document. However, if an aircraft is located at C the absence of a resultant frequency produces a null condition on the 6° approach line so that it is not possible to provide a glide slope of 6° with the known system. The diagram of FIG. 3 depicts the linear amplitude of the lobe signals at different elevation angles. The signals C.S.B. and S.B.O. fed to the antenae 7 and 8, respectively, may be produced in any convenient way but for the sake of example FIG. 4 shows a block schematic diagram indicating a typical equipment for producing the signals C.S.B. and S.B.O.

Figure 4:
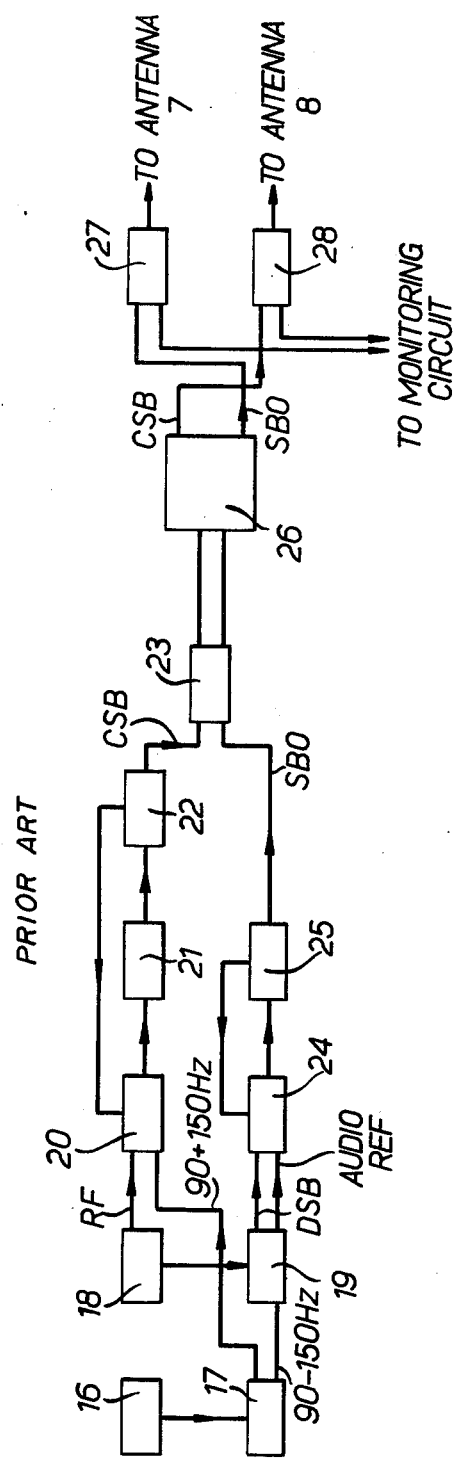
FIG. 4 shows a block schematic diagram of a typical signal generating arrangement for the energisation of the glide path antenna system of FIG. 2.

Referring briefly to FIG. 4 a sideband generator 16 producing signals of 90 Hz and 150 Hz feeds these signals into a sideband multiplier 17 which produces outputs of 90 + 150 Hz and 90 − 150 Hz. An exciter 18 generates a carrier frequency signal in band 328-336 MHz and this signal is fed to a modulation driver circuit 20 to which the 90 + 150 Hz output from sideband multiplier 17 is also fed. The modulation driver drives a transmitter 21 for generating the signal C.S.B. and signal C.S.B. is supplied from detector 22 to an R.F. coupler 23.

Reverting to the exciter 18 this feeds carrier frequency signals to a mixer 19 to which the 90-150 Hz is supplied. The mixer produces two outputs consisting of double sideband and audio reference signals. These are fed to a transmitter 24 and detector 25 from which signal S.B.O. is derived. This signal S.B.O. is fed to the R.F. coupler which also receives the signal C.S.B. as aforesaid. These signals C.S.B. and S.B.O. are fed through a radio frequency changeover unit 26 to distribute unit 27 and 28 from which the signals C.S.B. and S.B.O. are fed to the antennae 8 and 7 respectively. (see FIG. 2).

Figure 5:
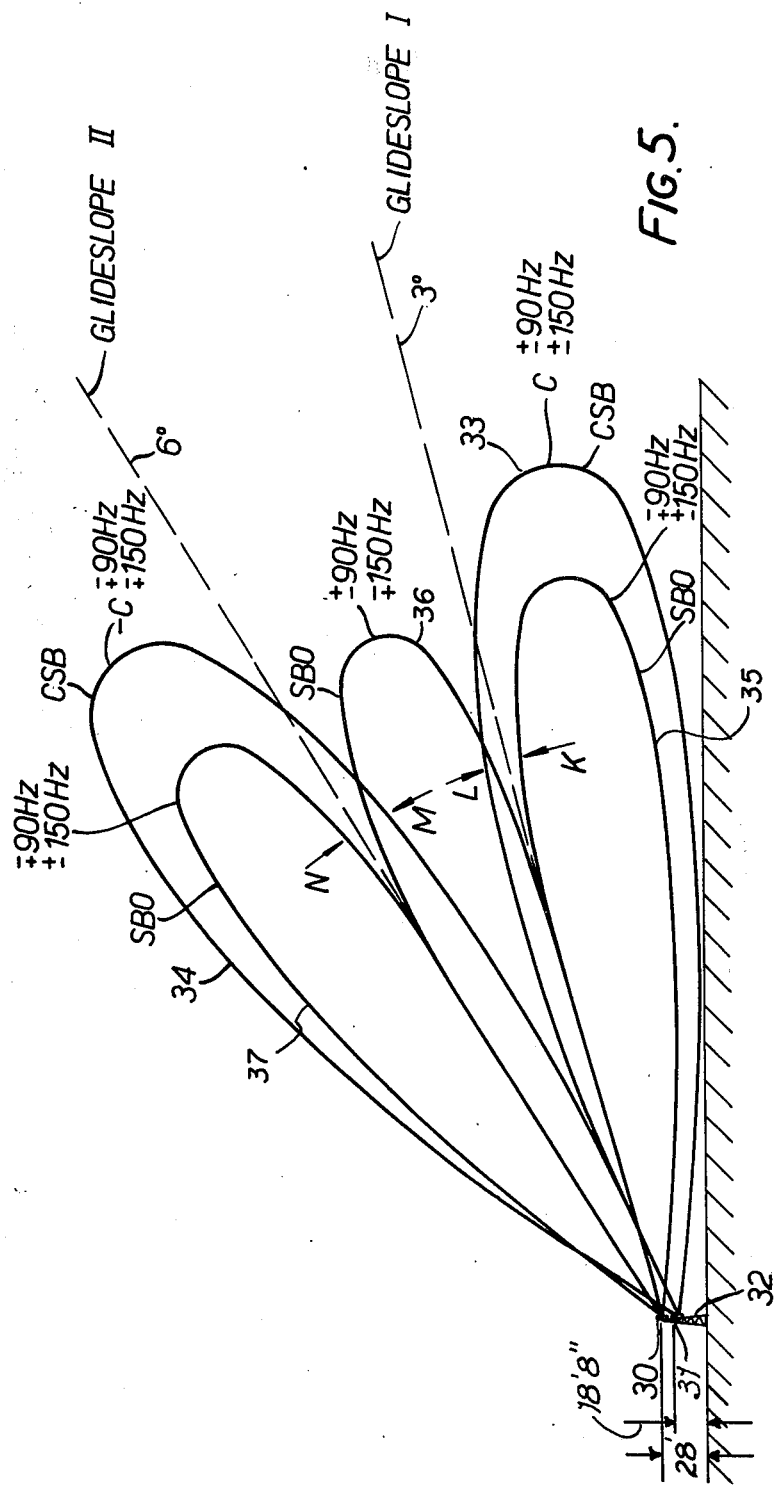
FIGS. 5 and 6 show, respectively, the elevation radiation pattern and linear amplitude against elevation characteristic diagram of the glide slope antenna system according to the present invention.
Figure 6:
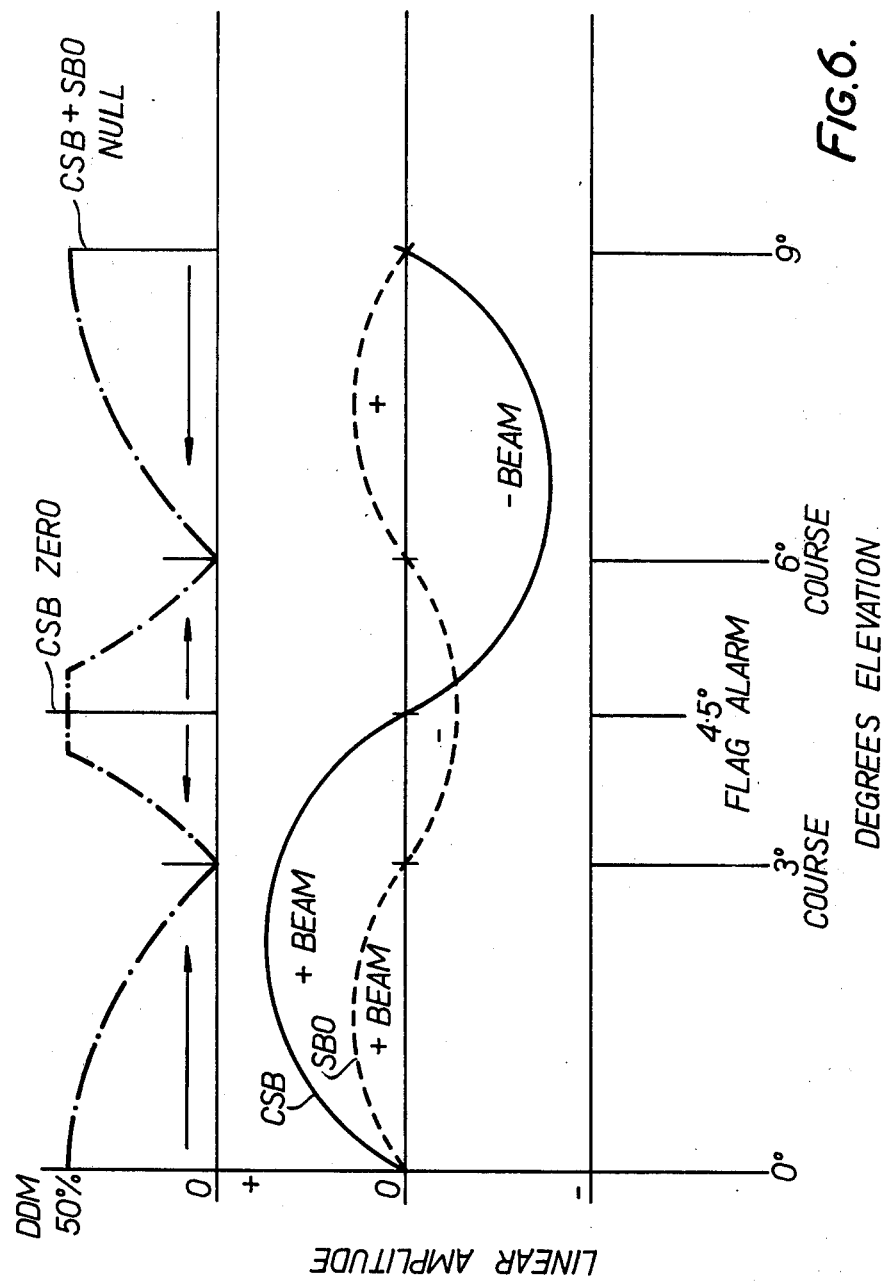

In practice the signals fed to the antennae will be monitored by additional equipment not shown in the drawing Referring now to FIGS. 5 and 6 of the drawings these show the radiation pattern of one glide path antenna system according to the invention. The glide slope antenna system comprises two antennae 30 and 31 mounted on a supporting mast 32 so that the ratio of heights of antennae 30 and 31 above ground is in the ratio of 3 : 2. The upper antenna 30 may be approximately 28 feet above ground in which case the lower antenna 31 will be at approximately 18 feet 8 inches above ground. These two antennae 30 and 31 when fed with the signals S.B.O. and C.S.B., respectively, produced for example as shown in FIG. 4 described in connection with the known glide path antenna system, produce an elevation radiation pattern depicted in FIG. 5 and the linear amplitude against elevation curves of this pattern and the corresponding D.D.M. are shown in FIG. 6

Referring to FIG. 5 it can be seen that the antenna 31 produces C.S.B. lobes 33 and 34 whilst the antenna 30 produces S.B.O. lobes 35, 36 and 37. By considering the resultants of lobe signals received at location K,L,M and N on the radiation pattern it can be seen that an approaching aircraft at K which will have been assigned the 3° glide slope by A.T.C. will receive a "fly-up" signal (150 Hz predominating) whereas L will receive a "fly-down" signal (90 Hz predominating). These signals enable the aircraft to enter the 3° glide slope. Should the aircraft be assigned the 6° glide slope and is located at position M then it receives a "fly-up" signal (150 Hz predominating) whereas at position N it will receive a "fly-down" signal (90 Hz predominating). Thus the aircraft can be guided on to the 6° glide slope. The problems previously encountered with the null condition slope at 6° and inverted course at 9° are eliminated by the adjustment of the ratio between heights of the upper and lower antennae from 2 : 1 to 3 : 2.

Figure 7:
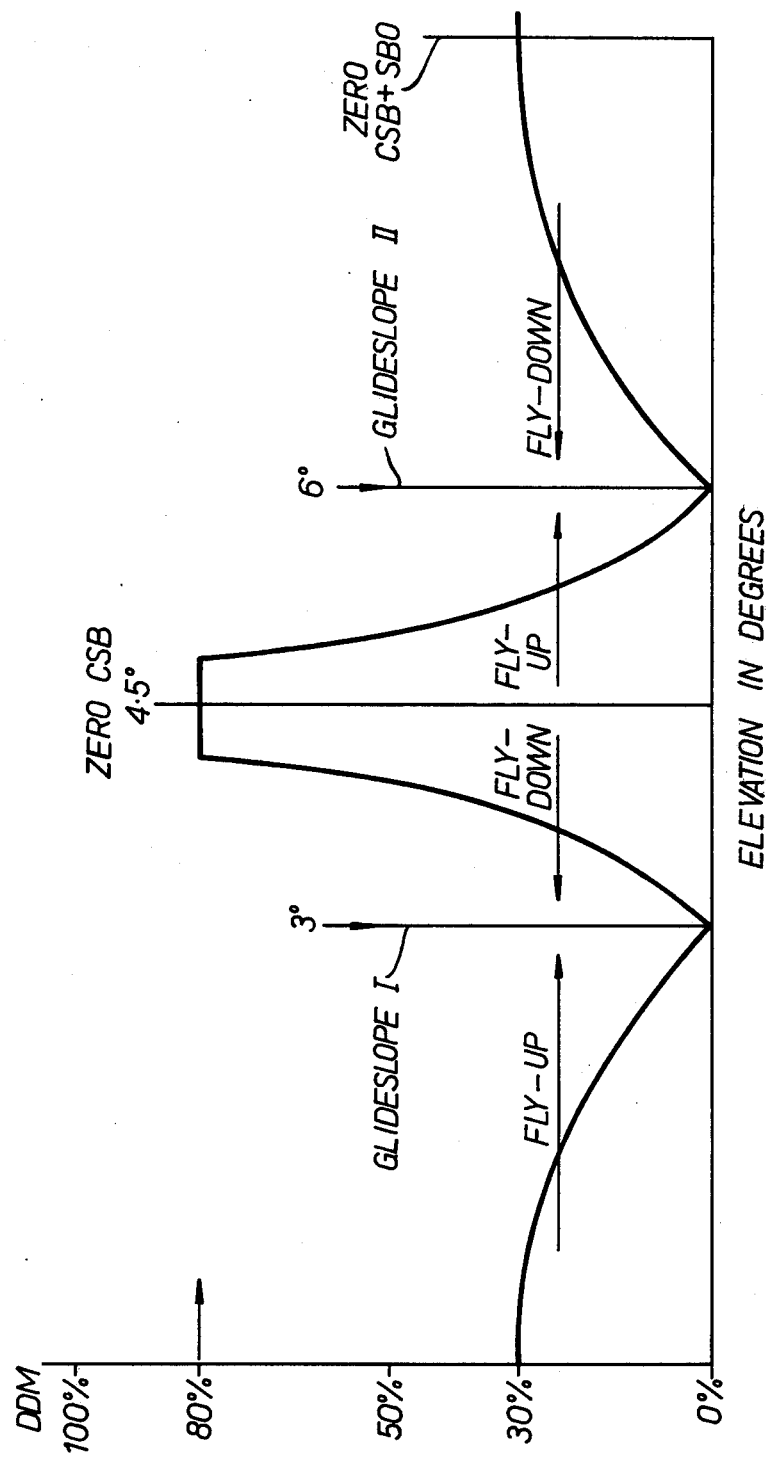
FIGS. 7 and 8 show D.D.M. signals against elevation characteristics of the glide slope antenna system according to the present invention.
Figure 8:
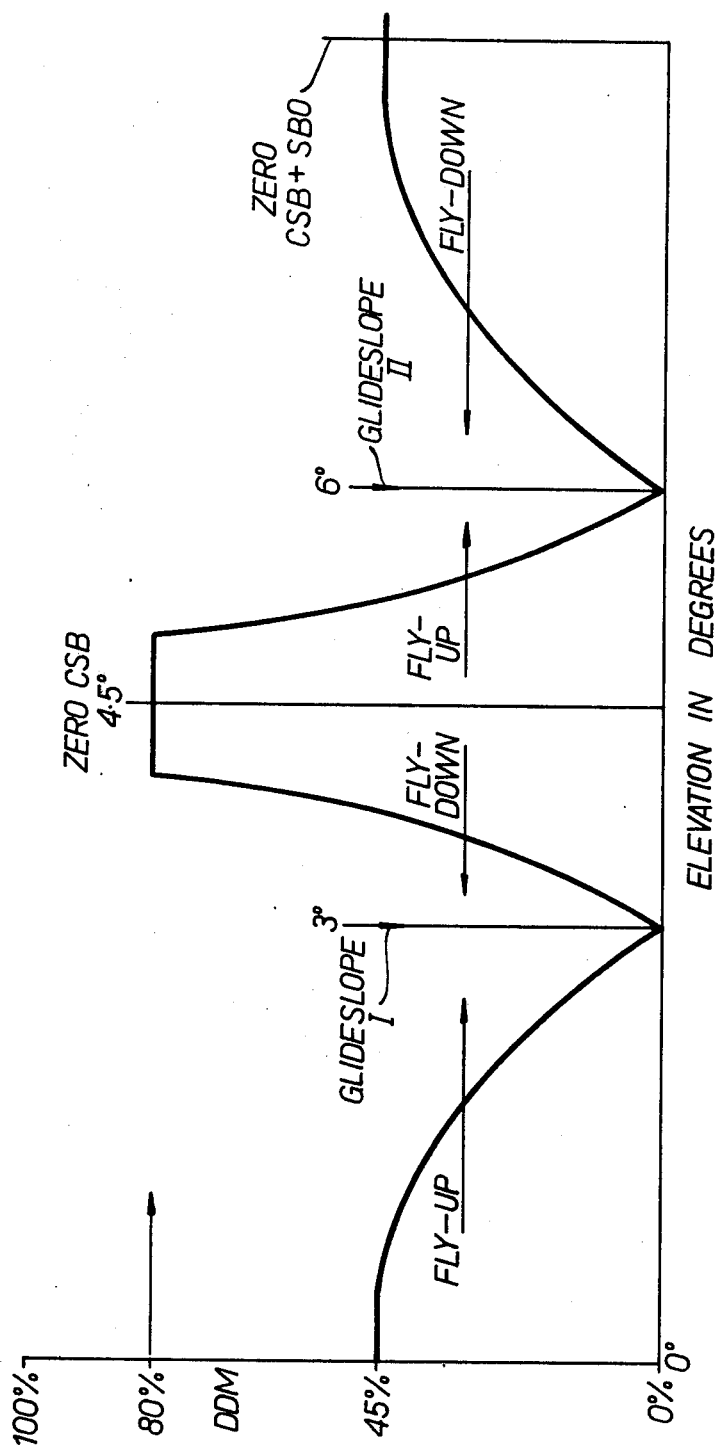

It will be seen from FIGS. 6 and 7 and 8 showing D.D.M. against elevation that good "fly-up" signals are given from the lowest angle to the 3° glide slope with uniform slope of D.D.M. Above the 3° glide slope "fly-down" information is given up to an angle of 4.2° when a "flag" alarm will be operated due to low carrier level. Above 4.8° the flag will disappear and high D.D.M. "fly-up" information will be produced with a uniform slope to the second glide slope at 6° elevation. Above this 6° slope "fly-down" information is given up to an angle of 8.7° above which a "flag" alarm will appear showing null signal strength at 9°.

The 3° and 6° glide slopes are nearly symmetrical in sensitivity and the S.B.O. level will be adjusted to make the 3° slope conform with I.C.A.O. recommendations. The 6° slope will therefore by geometry have the same sensitivity in terms of D.D.M. per degree and double in terms of glide slope angle.

The sensitivity of the glide slope can be varied by adjustment of the S.B.O signal level fed to the upper antenna 30 (FIG. 5). In FIGS. 7 and 8 two sensitivity values are shown i.e. 10% and 15%, respectively.

What we claim is:

1. An aircraft landing system for aircraft having I.L.S. equipment, including a glide slope antenna system which comprises two antennae mounted on a support structure at respective heights above ground in the ratio of 3:2 and signal generating and distribution means for generating and feeding respective signals to said antennae so that the antennae provide in combination a multi-lobe radiation pattern which produces resultant signals just below and just above slope paths at 3° and 6° angles to the ground for generating in an approaching aircraft "fly-up" and "fly-down" signals, respectively thereby providing for glide slope approaches by aircraft at said angles.

2. An aircraft landing system as claimed in claim 1, in which the glide slope antenna system is of the "null reference" type.

3. An aircraft landing system as claimed in claim 2, in which the lower antenna of the glide slope antenna system is fed with an R.F. carrier plus double sideband signals and in which the upper antenna is fed with sideband signals without said R.F. carrier.

4. An aircraft landing system as claimed in claim 1, in which the glide slope antenna system is located at a position offset to one side of the centre line of the runway near the approach or threshold end of the runway and in which a localiser antenna system for affording guidance of an aircraft along the centre line of the runway is located at the far end of said runway.

5. An aircraft landing system as claimed in claim 1, in which the antennae of a glide slope antenna system are located at 28 feet and 18 feet 8 inches, respectively above ground, the signal fed to the lower antenna being a double sideband carrier with the carrier being within the band 328–336MHz and the sidebands being separated from the carrier by 90Hz and 150Hz but whose mean frequency components are in phase with the carrier, and the signal fed to the upper antenna being a double sideband signal with the sidebands separated by 90Hz and 150Hz, the mean frequency components of the 150Hz sideband being 180° out of phase with the mean frequency components of the 90Hz sideband and the mean frequency components of the 90Hz sideband being in phase with the carrier of said double sideband carrier signal.

6. An aircraft landing system for helicopters as claimed in claim 1, in which the glide slope antenna system is combined with an I.L.S. localiser antenna system adjacent a landing pad.

* * * * *